(12) United States Patent
Poeggel et al.

(10) Patent No.: US 10,527,502 B2
(45) Date of Patent: Jan. 7, 2020

(54) TEMPERATURE SENSOR

(71) Applicant: UNIVERSITY OF LIMERICK, Limerick (IE)

(72) Inventors: Sven Poeggel, Neu Broderstorf (DE); Dinesh Babu Duraibabu, Castletroy (IE); Gabriel Leen, Cork (IE); Gerard Dooly, Limerick (IE); Elfed Lewis, County Clare (IE)

(73) Assignee: UNIVERSITY OF LIMERICK, Limerick (IE)

( * ) Notice: Subject to any disclaimer, the term of this patent is extended or adjusted under 35 U.S.C. 154(b) by 177 days.

(21) Appl. No.: 15/574,448

(22) PCT Filed: May 21, 2016

(86) PCT No.: PCT/EP2016/061511
§ 371 (c)(1),
(2) Date: Nov. 15, 2017

(87) PCT Pub. No.: WO2016/185050
PCT Pub. Date: Nov. 24, 2016

(65) Prior Publication Data
US 2018/0136055 A1 May 17, 2018

(30) Foreign Application Priority Data

May 21, 2015 (EP) ..................................... 15168622
May 21, 2015 (EP) ..................................... 15168623

(51) Int. Cl.
*G01K 11/32* (2006.01)
*G01K 5/32* (2006.01)
*G01K 5/58* (2006.01)

(52) U.S. Cl.
CPC ............ *G01K 11/3206* (2013.01); *G01K 5/32* (2013.01); *G01K 5/58* (2013.01)

(58) Field of Classification Search
CPC ......... G01K 11/3206; G01K 5/32; G01K 5/58
See application file for complete search history.

(56) References Cited

U.S. PATENT DOCUMENTS 4,752,141 A * 6/1988 Sun .................... G01D 5/268
                                                   250/227.21
4,986,671 A * 1/1991 Sun ..................... A61B 5/0215
                                                   250/227.14
(Continued)

FOREIGN PATENT DOCUMENTS

WO    WO-2004009957 A1    1/2004

OTHER PUBLICATIONS

Totò, Nicola, "International Search Report," prepared for PCT/EP2016/061511, dated Aug. 4, 2016, four pages.
(Continued)

Primary Examiner — Lisa M Caputo
Assistant Examiner — Philip L Cotey
(74) Attorney, Agent, or Firm — Winstead PC

(57) ABSTRACT

A temperature sensor (1) has a pressure sensor (10), the distal end of which is inserted in a sealed chamber (2) filled with a liquid. The pressure sensor has a light guide (4), a cavity (14) at a distal end of the light guide, a diaphragm (11) forming a wall of the cavity and being configured to deflect with applied pressure, and a detector to detect changes in light reflection due to deflection of the diaphragm. The liquid (3) which changes volume in response to temperature changes and this volume change is sufficient to change the pressure applied on the diaphragm (11), and the a interrogation system processes pressure data and/or light reflection data to generate an output indicating temperature of the fluid in the chamber.

18 Claims, 3 Drawing Sheets

(56) References Cited

U.S. PATENT DOCUMENTS

| | | | | |
|---|---|---|---|---|
| 4,988,212 A | * | 1/1991 | Sun | G01D 5/268 250/227.11 |
| 7,423,762 B2 | * | 9/2008 | Schmidt | G01D 5/266 356/35.5 |
| 8,764,678 B2 | | 7/2014 | Bremer et al. | |
| 2005/0231729 A1 | * | 10/2005 | Lopushansky | G01D 5/268 356/480 |
| 2006/0011820 A1 | * | 1/2006 | Chow-Shing | A61B 5/01 250/227.14 |
| 2006/0034559 A1 | * | 2/2006 | Arias Vidal | G01L 11/02 385/13 |
| 2007/0006663 A1 | * | 1/2007 | Zerwekh | G01K 11/3206 73/800 |
| 2009/0219542 A1 | * | 9/2009 | Waegli | G01K 11/3206 356/451 |
| 2009/0226128 A1 | * | 9/2009 | Donlagic | G01D 5/268 385/13 |
| 2010/0321703 A1 | * | 12/2010 | Harpin | G01K 11/3206 356/477 |
| 2011/0190640 A1 | * | 8/2011 | Bremer | A61B 6/00 600/478 |
| 2011/0264398 A1 | * | 10/2011 | Niewczas | G01D 3/0365 702/130 |
| 2014/0168659 A1 | * | 6/2014 | Suri | G01D 5/268 356/480 |
| 2014/0318273 A1 | * | 10/2014 | Dong | G01K 11/3206 73/862.624 |

OTHER PUBLICATIONS

Poeggel, Sven, et al., "Miniature Optical Fiber Combined Pressure- and Temperature Sensor for Medical Applications," 2013 IEEE Sensors, IEEE, Oct. 28, 2012, pp. 1-4.

Kang, Hyun-Kyu, et al., "Simultaneous Monitoring of Strain and Temperature During and After Cure of Unsymmetric Composite Laminate Using Fibre-Optic Sensors" Smart Materials and Structures, IOP Publishing Ltd., vol. 12, No. 1, Jan. 10, 2003, pp. 29-35.

* cited by examiner

BLS ... Broadband light source
OSA ... Optical spectrum analyzer
3dB ... Optical light coupler OFTS ... Optical temp sensor
BTS ... Reference temp sensor

TEMPERATURE SENSOR

The invention relates to sensors.

Our prior patent specification U.S. Pat. No. 8,764,678 describes a pressure sensor having a Fabry-Perot interferometer ("FPI") and an in-fiber Bragg grating ("FBG"). Deflection of a glass diaphragm changes length of a cavity at the end of the fiber. The FBG is used as a reference sensor to measure temperature and to eliminate temperature cross-sensitivity from the pressure measurement.

The invention is directed towards achieving improved sensitivity and resolution in a sensor.

SUMMARY OF THE INVENTION

According to the invention, there is provided a temperature sensor comprising:
- a pressure sensor comprising:
  - a light guide,
  - a cavity at a distal end of the light guide,
  - a diaphragm forming a wall of the cavity and being configured to deflect with applied pressure,
  - a detector to detect changes in light reflection due to deflection of the diaphragm;
- a chamber containing at least the distal end of the pressure sensor and a fluid which changes volume in response to temperature change sufficient to change pressure applied on the diaphragm; and
- a processor configured to process pressure data and/or light reflection data and to generate an output indicating temperature.

In one embodiment, the chamber fluid is a liquid. In one embodiment, the liquid is an oil. In one embodiment, the chamber has a volume of at least 0.1 mm³.

In one embodiment, the fluid chamber is cylindrical. In one embodiment, the pressure sensor cavity is a Fabry-Perot interferometer.

In one embodiment, the pressure sensor includes a fibre Bragg Grating (FGB) for coarse temperature measurement, in which thermal expansion or construction of the FBG causes a shift of the Bragg wavelength. In one embodiment, the FBG has a temperature resolution of 0.1° C. or higher. In one embodiment, the Bragg Grating is in-fiber.

In one embodiment, the diaphragm has a thickness in the range of 1 μm to 10 μm. In one embodiment, the diaphragm has a diameter which is at least 40 times the diaphragm thickness.

In one embodiment, the chamber is transparent. In one embodiment, the chamber has an outside lateral dimension of less than 1 mm.

In one embodiment, the light guide is an optical fibre.

In another aspect, the invention provides a method of measuring temperature changes in human tissue or fluids, the method comprising the steps of inserting a chamber of a sensor as defined above in any embodiment into the tissue or fluid and monitoring outputs from the processor.

In one embodiment, the method is performed in medical applications to measure temperature changes in tissue or fluids while in-vivo.

In one embodiment, the method is performed in medical radiotherapy applications to measure temperature changes in tissue or fluid and to correlate the temperature changes with radiation dose.

In another aspect, the invention provides a method of measuring temperature changes in industrial applications, comprising the steps of placing the chamber of a sensor as defined above in any embodiment at a desired location and monitoring the processor output.

DETAILED DESCRIPTION OF THE INVENTION

The invention will be more clearly understood from the following description of some embodiments thereof, given by way of example only with reference to the accompanying drawings in which:—

Figure 1:
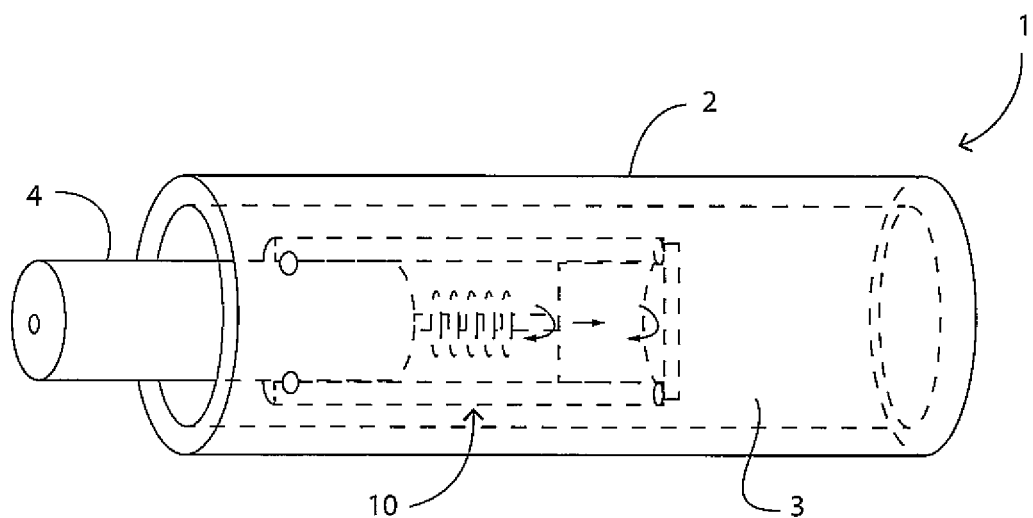
FIG. 1 is a diagrammatic side view of a temperature sensor of the invention.
Figure 2:
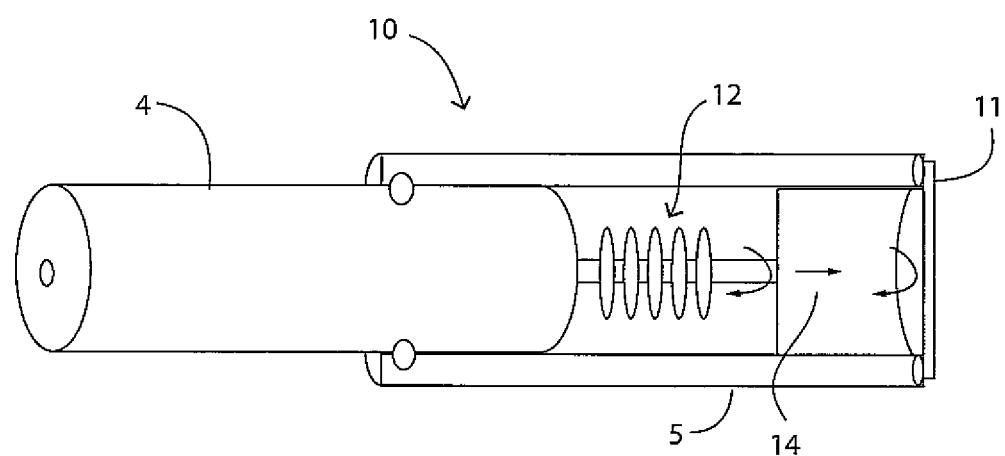
FIG. 2 is a perspective diagram showing the pressure sensor forming part of the temperature sensor.

Referring to FIGS. 1 and 2 a temperature sensor 1 comprises a chamber 2 of cylindrical shape and containing a fluid (for example, oil) 3. A sensor 10 of the type described in U.S. Pat. No. 8,764,678 is inserted into the chamber 2 and is sealed to the internal surface of the chamber by fusing or bonding to provide a closed volume filled with oil 3.

The pressure sensor 10 comprises a fibre 4, an FBG 12 within a capillary 5, and a cavity 14 defined between the FBG 12 and a diaphragm 11. The pressure sensor 10 is described in detail in U.S. Pat. No. 8,764,678, the contents of which are incorporated herein.

The FBG 12 is fabricated by making a periodic change in the refractive index in the core of the fiber 4. The periodicity is given by the distance of each change causing a reflection of light at the corresponding Bragg-wavelength ($\lambda_B$). A change of temperature ($\Delta T$) cause an expansion/contraction of the glass fibre 4, which in turn changes the refractive index period of the inscribed fibre Bragg grating. This results in a shift of the Bragg-wavelength in the optical spectrum, shown in (1).

$$\Delta\lambda_B(T)=\lambda_B(1+\xi)\Delta T \quad (1)$$

The FPI sensor 10 is based on a single-mode fibre (SMF) 4 surrounded by a capillary 5 and closed by a thin section of multi-mode fibre (MMF) 11, which forms the FPI sensor diaphragm.

The construction results in a sealed cavity 14, filled with a gas (e.g. air) only. The diaphragm is thin in thickness (for example, diaphragm thickness=h=~2 μm) and respectively large in diameter: 2r=130 μm, in general preferably at least 40 times the thickness. This results in a high sensitivity to pressure change in the surrounding medium, as illustrated in Equation 2, where $\Delta G$ is the diaphragm deflection, μ is Poisson's ratio for glass, r is the radius of the diaphragm, h is the diaphragm thickness, E is Young's modulus and $\Delta P$ is the change in pressure.

$$\Delta G = \frac{3}{16} \cdot \frac{(1-\mu^2)}{E} \cdot \frac{r^4}{h^3} \cdot \Delta P \quad (2)$$

The chamber 2 has a diameter of $d_o$=0.87 mm and is closed on one side and completely filled with a fluid (e.g. oil) 3. The pressure sensor (OFPS) 10 enters the oil-filled chamber from the other side of the capillary and is sealed with, for example: water/oil resistant adhesive, or can be fused to the FPI glass capillary 5. The fluid-filled chamber 2 can be composed of materials other than glass e.g. a metal in a different embodiments, however as a glass-capillary is transparent, it allows for observing impurities such as air-bubbles that can act as buffer (i.e. low pass filter). in terms of the pressure experienced inside the fluid filled cavity and furthermore an all glass construction can be advantageous in terms of the sensor fabrication and suitability for certain applications.

We have observed that the temperature sensor 1 is hyper sensitive and responsive (very fast) to ambient temperature changes. For a minute change in ambient temperature there is a corresponding minute change in the volume of the fluid 3 due to thermal expansion of the fluid 3. However, the change in volume causes the diaphragm 11 of the EFPI/FBG sensor 10 to deflect significantly and the volume change per ° C. depends primarily on the thermal coefficient of expansion of the fluid 3 inside the capillary 2. The high temperature sensitivity is primarily based on:
a) Volume change of the fluid 3, per ° C. change in temperature and the size of the cavity 14 in the optical sensor 10.
b) The high resolution measurement of small changes in the length of the cavity 14.
c) The thickness of the diaphragm 11, which can generally be in the range of 1 μm to 10 μm, depending on the sensor application requirements, with a preferred thickness in the region of 2 μm to 3 μm. In general, the thinner the diaphragm 11 the more sensitive the temperature sensor 1 is. However, for high resolution temperature measurement applications at elevated temperatures, the fluid 3 may expand enough to apply an excessive force on the diaphragm 11, hence it may be necessary to have a thicker diaphragm in certain applications.

The thermal coefficient of expansion and the quantity of the liquid 3 influence the responsiveness/sensitivity of the high resolution temperature sensor 1 and the measurable temperature range. The responsiveness/sensitivity of the sensor can be tailored for a given application by: selecting the properties and physical geometric dimensions of the FPI based on the sensing element 10; selecting the properties and physical geometric dimensions of the chamber 2; and the properties of the fluid 3. By way of example, Table 1 provides a list of fluids which may be suitable for use in a given application of the sensor and their respective thermal coefficients of expansion.

TABLE 1

| Liquid | Volumetric Coefficient of Expansion (1/K, 1/° C.) |
| --- | --- |
| Acetic acid | 0.00110 |
| Acetone | 0.00143 |
| Alcohol, ethyl (ethanol) | 0.00109 |
| Alcohol, methyl | 0.00149 |
| Ammonia | 0.00245 |
| Benzene | 0.00125 |
| Bromine | 0.00110 |
| Ethylene glycol | 0.00057 |
| Freon refrigerant R-12 | 0.0026 |
| Hydrochloric acid, 33.2% solution | 0.00046 |
| Isobutyl alcohol | 0.00094 |
| Glycerine (glycerol) | 0.00050 |
| Kerosene, jet fuel | 0.00099 |
| Oil (unused engine oil) | 0.00070 |
| Olive oil | 0.00070 |
| Paraffin oil | 0.000764 |

TABLE 1-continued

| Liquid | Volumetric Coefficient of Expansion (1/K, 1/° C.) |
| --- | --- |
| n-Pentane | 0.00158 |
| Phenol | 0.0009 |
| Water | 0.000214 |

Example fluids which could be used in the chamber and their coefficients of thermal expansion.

By way of example: consider a temperature sensor 1 comprising a 200 μm ID chamber 2 with a 1 mm length containing the oil, a cavity 14 of length 20 μm to 40 μm, and a capillary 5 length of 5 mm to 10 mm. This would yield a theoretical diaphragm 11 deflection of about 125 nm/K. Detection of this physical diaphragm deflection is observed as a shift in the optical spectrum and is a function of the FPI construction and the resolution of the optical interrogation equipment and associated processing software. The sensor in this example may be made from quartz glass or borosilicate for example.

Temperature is transduced into a physical volume change in fluid present in the sealed chamber 2 due to the property of thermal expansion of the fluid 3. Therefore, temperature is transduced into a pressure variation which is measured by the FPI sensor 10. The pressure sensor 10 can very accurately measure this pressure variation, which is the result of a temperature variation. Thus there is a direct relationship/correlation between the modulating temperature and the observed pressure modulation.

Because the liquid 3 works as a transducer and the chamber 2 containing the liquid 3 is sealed, a small temperature change (i.e. volume change) causes a pressure change which is detected by the FPI sensor 10. The temperature change can be observed by an interferometer that monitors movements in the diaphragm 11. Furthermore, the pressure measurement derived from observing the diaphragm 11 deflection may be processed by a high resolution algorithm, resulting in an extremely high resolution temperature measurement.

The FBG 12 has a relatively low temperature resolution e.g. 0.1° C., however it has a wide temperature sensing range, e.g.: greater than 500° C. Typically, FBGs can have a temperature measurement resolution of around 0.1° C., which can be increased using high specification optical interrogation hardware/software.

The inclusion of a low resolution/wide range temperature sensing element (Bragg Grating 12) has the advantage of creating a combined low resolution and high resolution temperature sensing device. The result of the combined low and high resolution temperature sensing elements give a high resolution wide bandwidth temperature sensor.

The sensor 1 can be made with the outside diameter of the chamber 2 less than 1 mm, which makes the whole system extremely compact. Additionally, the sensor 1 in its current embodiment is a point sensor rather than a distributed sensor, which also offers advantages in many applications.

Since the transmission medium is an optical fiber, signals can also be measured at distances up to kilometres from the measurement point.

The sensor 1 can detect a temperature change less than 0.1 mK (i.e. micro Kelvin range) with an example sensitivity, of $$7.8 \frac{nm}{K}$$

shin in the optical spectrum This sensitivity value is calculated through real experimental results, with a large sensor, in diameter and length, compared to the example discussed previously and in addition the sensor evaluated had a small air bubble trapped in the fluid-filled chamber 2, which further reduces its sensitivity. Ideally there should be no air in the fluid-filled chamber. The combination of a Fabry-Perot interferometer (FPI)/fluid-expansion technique for high temperature measurement and an internal FBG for wide range temperature measurement allows for high temperature resolution, and a wide temperature range sensor. Furthermore, the sensor measures the temperature in reflection, which makes the whole system robust, inexpensive and easy to place in both medical and industrial applications. The sensor can be fabricated, for example, from glass, oil and adhesive making it compatible to electromagnetic fields, without any effect on the temperature measurement. When the temperature response of the sensor 1 is compared to a commercial temperature sensor (Bosch model: BM-100) the sensor exhibits a good linearity over the temperature measurement range and furthermore the sensor exhibits a very stable measurement over time.

The temperature sensor 1 is able to measure temperature using two techniques: a) an FGB for low resolution (around 0.1° C.) temperature measurement; and b) the oil expansion/contraction for high resolution temperature measurements (e.g. 0.0001° C. or better).

Figure 3:
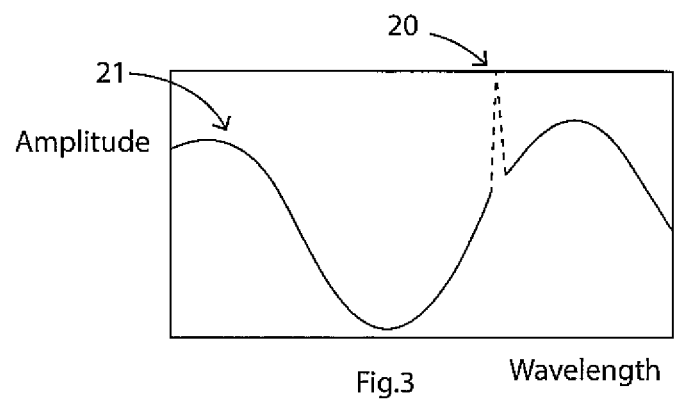
FIG. 3 is a plot showing operation of the temperature sensor.

The FBG sensing element 12 causes a peak 20 in the reflected optical spectrum 20 as shown in FIG. 3, which varies with temperature and provides a 'coarse' temperature measurement, with a tolerance of approximately +/−0.1° C. The FPI/FBG sensor 10 is enclosed and sealed in the fluid-filled chamber 2. The FPI signal modulates a cosine-like reflection in the reflected optical spectrum 21, resulting from deflections in the FPI diaphragm 11, which in turn are caused by a relative pressure difference between the ambient pressure and the pressure in the FPI cavity 14. This plot in FIG. 3 illustrates the combined FPI response 21 (cosine-like wave form) and the FBG response (a peak in the reflected optical spectrum optical 20).

An increase/decrease in temperature causes the oil volume (or other suitable fluid) to expand/contract due to thermal expansion. An example change in volume of oil per unit temperature might be 7×10^−4 per K. For example, quartz glass has a volume expansion factor in the region of 0.77×10^−6 per K. For example, a glass based embodiment may exhibit a ratio between the thermal coefficient of expansion of the fluid and of the structural elements, in the order of 1000 as illustrated in Equation 3.

$$\frac{\Delta \text{oil}}{\Delta \text{glass}} = ca.\ 1000. \qquad (3)$$

Small changes in temperature cause a fast and responsive change in the volume of the fluid 3, which is trapped in the sealed capillary 2. This results in significantly high pressure changes, since the oil is incompressible and acts as a linear pressure transducer as described in Equation 3, where α is the volumetric thermal expansion coefficient for the fluid (e.g.: 0.0007).

$$\frac{\Delta V}{V} = \alpha_V \Delta T \qquad (4)$$

Since the high resolution temperature sensor utilises an FPI sensor, changes in temperature can be observed by analysing the FPI spectral response (FIG. 3), which are in the range of 1500 nm-1600 nm for the example embodiment. The higher the temperature sensitivity (and with this the measurement resolution) the smaller the ultra-high temperature measurement range tends to be. The inclusion of an FBG (or other suitable 'coarse' temperature measuring device) in the sensor is used as a reference point with a low temperature resolution (e.g. 0.1° C.), and a wide temperature range (e.g. −100° C. to +100° C.). Combining both temperature measuring techniques results in a high resolution and wide range temperature sensor.

Example

Figure 4:
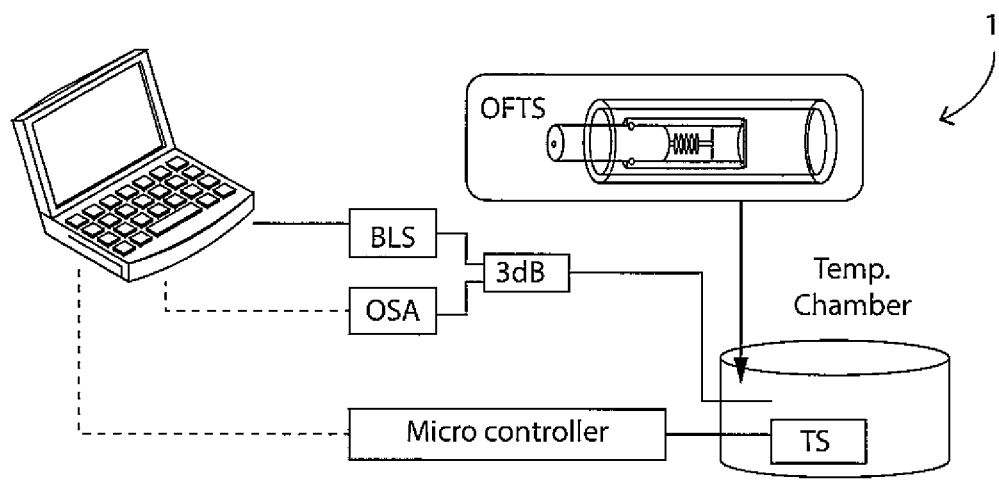
FIG. 4 is a diagram illustrating an experimental set-up for testing the temperature sensor.

By way of example, a possible embodiment of a full measurement system incorporating the herein disclosed invention is illustrated in FIG. 4. The main components of the system illustrated in FIG. 4 include a broadband light source (BLS), a 3 dB-coupler, an optical spectrum analyser (OSA) and a computer. To optimize the temperature measurement resolution, an advanced algorithm was developed to further analyse/process the OSA output and achieve a very high temperature resolution.

The example measurement system illustrated in FIG. 4 uses a BLS from Exalos, and emits light in the C+L band from 1520 nm-1600 nm with a Gaussian spectral power distribution and a total radiant power of 10 mW. Light from the BLS travels through the 3 dB coupler to the end of an optical fiber where the temperature sensor 1 (labelled OFTS in FIG. 4) resides. Light which enters the OFTS is modulated and a portion of the incident light is reflected and travels back to the 3 dB coupler into the optical spectrum analyzer (OSA) (e.g. I-MON 512 from Ibsen Photonics), which has a resolution of $$0.166 \frac{\text{nm}}{\text{pixel}}$$

and an accuracy of 5 pm. Analysis and processing of the OSA spectral interrogation can be used to determine the temperature at the measurement point.

Figure 5:
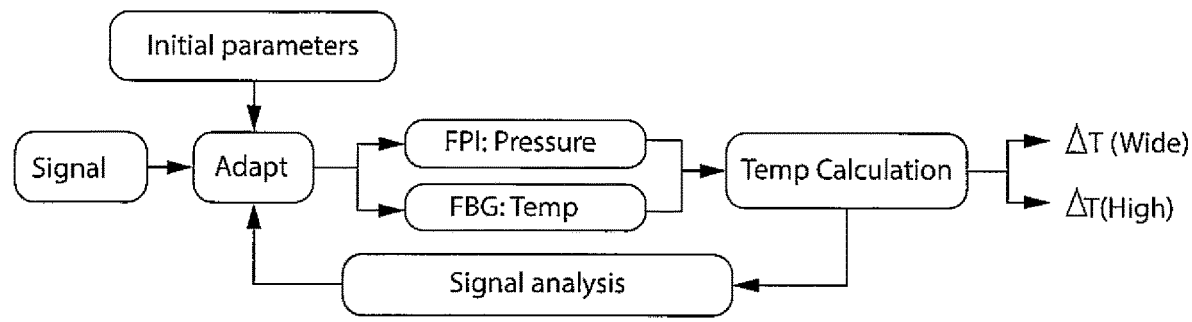
FIG. 5 is a diagram illustrating operation of control software for operation of the temperature sensor.

Software Example (FIG. 5)

The signal from the OSA is processed in order to determine the 'coarse' temperature observed by the FBG and to generate the FPI pressure measurement, which correlates with the high resolution temperature measurement. The OSA spectral signal is repaired, cleaned and adapted to improve the quality of the signal. The simultaneous measurement of pressure and temperature are undertaken by an FBG and FPI tracking algorithm. The FBG reading is used to analyze the wide range of the temperature. With a sensitivity of 0.01 nm/K (standard FBG sensitivity) a range of more than 500K can be observed, and in general has an upper limit determined by the temperature at which the glass used in the construction of the sensor starts to deform. The FPI based pressure measurement ΔP is used to determine the high resolution temperature measurement. An overview of the software algorithm used to generate intermediate results is shown in FIG. 5.

Figure 6:
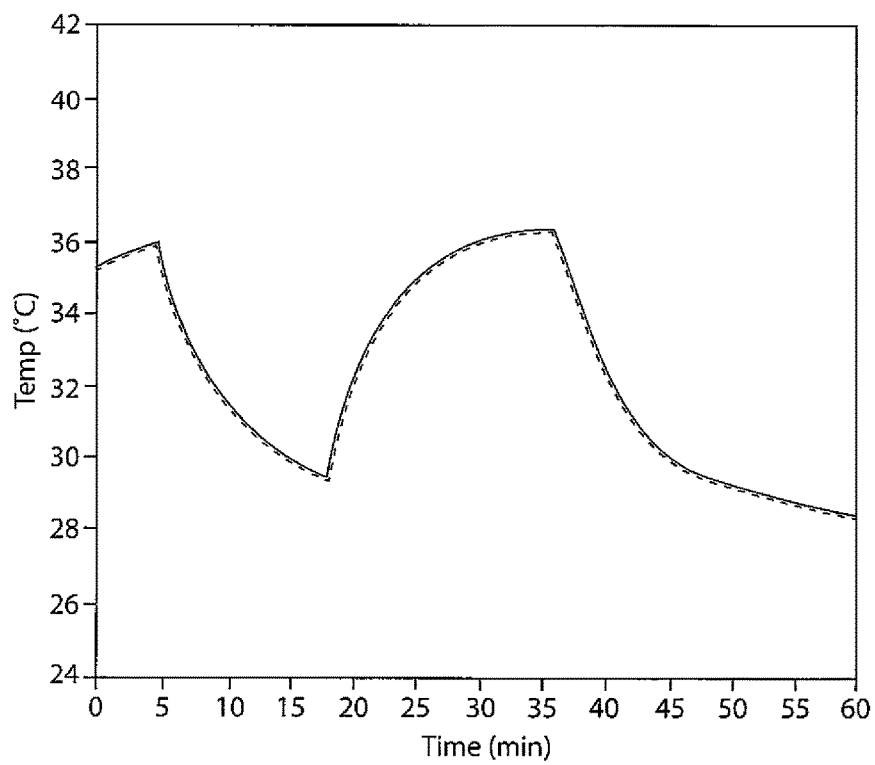
FIG. 6 is a temperature vs. time plot of the temperature sensor vs. BMP 085™ temperature sensor to show performance of the sensor.

FIG. 6 provides an example of the temperature sensor being compared to a commercial sensor when the temperature is varied in a temperature chamber. The temperature chamber was heated and cooled for the time period of 1 hour. The sensitivity of the sensor was measured over a 7K temperature range with a shift of $$\frac{53 \text{ nm}}{7 \text{ K}} = 7.6 \frac{\text{nm}}{\text{K}}$$

in the observed optical spectrum.

It will be appreciated that the sensor of the invention achieves:

Ultra high temperature measurement resolution.
Very rapid response (high bandwidth)
Optical fibre based sensor with the inherent advantages of same e.g. immune to EMI
Very small physical dimensions (e.g. less than 1 mm in diameter)
Can measure temperatures a long distance from the processing equipment as the optical fibre can be many 100s of meters in length Optical fibers have very low attenuation. This makes it possible to use the sensor at long distances from the measuring point. Also, optical fibers are inexpensive, and are not affected by electromagnetic interference. Also, the system does not have to be cooled/isolated unlike some electronic systems.

The herein disclosed sensor is suitable for in-vivo and ex-vivo calorific based measurement of radiation dose. When a material is exposed to radiation it will heat up due the incident energy. For example 4.16 Gy of incident radiation would produce the same amount of energy it would take to heat up 1 mm$^3$ of water 1° C. Hence, it is possible to use the sensor to measure the temperature change experienced by a material or tissue or fluid when exposed to radiation. By way of example, the sensor may be constructed entirely from glass and a biocompatible fluid. Due to the miniature size of the sensor and its biocompatible nature, the sensor may be co-located at a tumour site while radiotherapy is being administered. The radiation incident on the tumour will cause a temperature change in the tumour tissue. This temperature change can be used to assess the quantity of radiation administered.

The invention is not limited to the embodiments described but may be varied in construction and detail. Fluids other than an oil may also be used to fill the chamber 2. It is not essential to have the EFPI and FBG on the same fibre of the internal pressure sensor. However, it can be advantageous, allowing an extended combined sensitivity range.

The invention claimed is:

1. A temperature sensor comprising:
   a pressure sensor comprising:
      a light guide;
      a cavity at a distal end of the light guide;
      a diaphragm forming a wall of the cavity and being configured to deflect with applied pressure; and
      a detector to detect changes in light reflection due to deflection of the diaphragm;
   a chamber containing at least the distal end of the pressure sensor and a fluid which changes volume in response to temperature change sufficient to change the pressure applied on the diaphragm, the chamber being closed at one end;
   a processor configured to process pressure data and/or light reflection data, and to generate an output indicating temperatures;
   wherein the pressure sensor enters the chamber from a side of the chamber opposite the closed end; and
   wherein the distal end of the pressure sensor is sealed within the chamber so as to form a closed volume filled with said fluid.

2. The temperature sensor as claimed in claim 1, wherein the fluid is a liquid.

3. The temperature sensor as claimed in claim 2, wherein the liquid is an oil.

4. The temperature sensor as claimed in claim 1, wherein the chamber has a volume of at least 0.1 mm3.

5. The temperature sensor as claimed in claim 1, wherein the chamber is cylindrical.

6. The temperature sensor as claimed in claim 1, wherein the cavity is a Fabry-Perot interferometer.

7. The temperature sensor as claimed in claim 1, wherein the pressure sensor includes a fibre Bragg grating for coarse temperature measurement, in which thermal expansion or construction of the FBG causes a shift of the Bragg wavelength.

8. The temperature sensor as claimed in claim 7, wherein the grating has a temperature resolution of 0.1° C. or higher.

9. The temperature sensor as claimed in claim 7, wherein the grating is in-fiber.

10. The temperature sensor as claimed in claim 1, wherein the diaphragm has a thickness in the range of 1 μm to 10 μm.

11. The temperature sensor as claimed in claim 1, wherein the diaphragm has a diameter which is at least 40 times a thickness of the diaphragm.

12. The temperature sensor as claimed in claim 1, wherein the chamber is transparent.

13. The temperature sensor as claimed in claim 1, wherein the chamber has an outside lateral dimension of less than 1 mm.

14. The temperature sensor as claimed in claim 1, wherein the light guide is an optical fibre.

15. A method of measuring temperature changes in human tissue or fluids, the method comprising:
   inserting a chamber of the temperature sensor of claim 1 into the tissue or fluid; and
   monitoring outputs from the processor.

16. The method as claimed in claim 15, wherein the method is performed in medical applications to measure temperature changes in tissue or fluids while in-vivo.

17. The method as claimed in claim 15, wherein the method is performed in medical radiotherapy applications to measure temperature changes in tissue or fluid and to correlate the temperature changes with radiation dose.

18. A method of measuring temperature changes in industrial applications, the method comprising:
   placing the chamber of the temperature sensor as claimed in claim 1 at a desired location; and
   monitoring an optical signal output.

* * * * *